No. 622,781. Patented Apr. 11, 1899.
W. A. PUNGS.
BRAKE BEAM.
(Application filed Feb. 2, 1898.)
(No Model.)
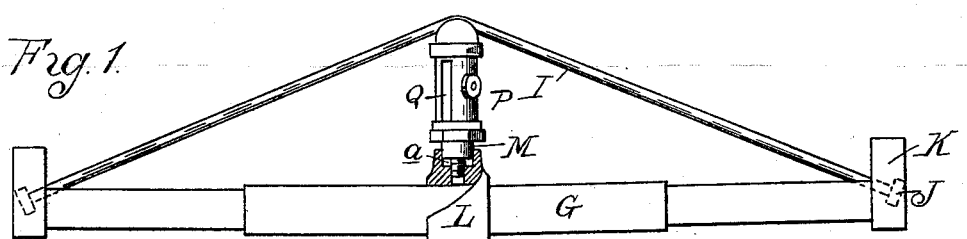
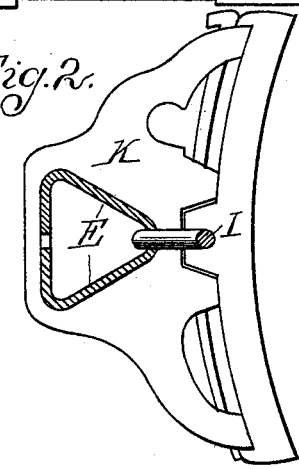
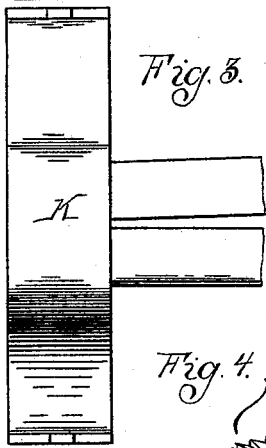
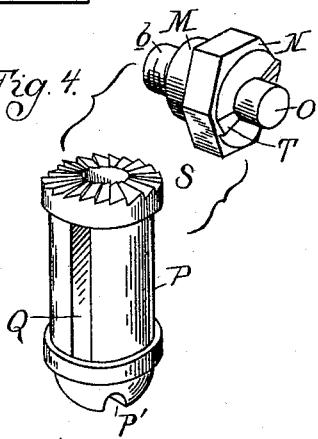
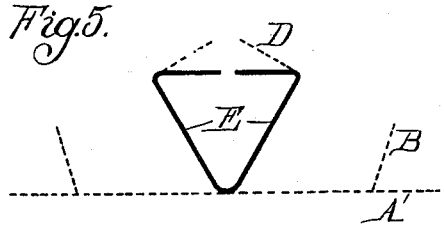
Witnesses:
Inventor:
William A. Pungs,
By
Attorneys.

UNITED STATES PATENT OFFICE.

WILLIAM A. PUNGS, OF DETROIT, MICHIGAN, ASSIGNOR TO THE AMERICAN BRAKE BEAM COMPANY, OF WAUKEGON, ILLINOIS.

BRAKE-BEAM.

SPECIFICATION forming part of Letters Patent No. 622,781, dated April 11, 1899.

Application filed February 2, 1898. Serial No. 668,803. (No model.)

*To all whom it may concern:*

Be it known that I, WILLIAM A. PUNGS, a citizen of the United States, residing at Detroit, in the county of Wayne and State of Michigan, have invented certain new and useful Improvements in Brake-Beams, of which the following is a specification, reference being had therein to the accompanying drawings.

The invention consists in the construction of a brake-beam, and particularly in the construction of the main or beam member thereof, whereby its manufacture is cheapened, the beam strengthened, and various difficulties now existing in sheet-metal beams is overcome.

The invention consists, further, in the construction, arrangement, and combination of the various parts, all as more fully hereinafter described, and shown in the drawings, in which—

Figure 1 is a top plan view of a brake-beam embodying my improvements. Fig. 2 is a cross-section thereof near one end. Fig. 3 is a rear elevation of one end of the beam with the brake-head thereon. Fig. 4 shows in perspective the parts of the adjustable strut detached. Fig. 5 is a diagram illustrating how the beam may be bent up from the plain blank, and Fig. 6 is a section near the middle of the beam.

The compression member of the beam (in case a truss-rod is employed) I construct from a single sheet of metal, as follows: A sheet of metal A of the desired width and length is first bent to have the side flanges B along the entire length of each edge. It is then bent into a trough shape, with the side flanges projecting upwardly and inwardly, as shown in dotted lines at D. Then the side flanges are bent down into line, and the beam thus formed will be of the cross-section shown by full lines lettered E. This form I describe as a trough shape, with inturned flanges, and its preferred form is that shown in the drawings, in which the body of the beam is substantially a V shape, and the flanges turned inward form substantially a triangular beam.

The body of the beam may be of U shape or of other shapes, with the inturned flanges, although I prefer the cross-section shown in the drawings on account of its obvious advantages in lightness and strength.

In case the beam is made of very light metal it may be centrally reinforced with a sleeve G of the shape of the main beam, but shorter and fitting thereon. By leaving the flanges of the beam slightly separated and making the opening in the outer beam slightly smaller than the outer face of the inner beam and then forcing it on under pressure the spring of the metal will tightly hold the two sections together without any rattling. In this construction I preferably make the opening in the outer sleeve on the opposite side from the opening or slit in the inner member, as will be seen from inspection of Fig. 6.

I may use sufficiently heavy metal for the inner beam, so that when the sleeve is placed thereon it will sufficiently strengthen the beam as to enable me to dispense with the truss-rod, a suitable brake-lever support being secured to the beam at its middle and suitable brake-heads being secured to its ends in any desired manner. I preferably, however, use the truss-rod I, having integral heads J, engaging in sockets formed in the brake-heads K. These brake-heads are socketed to engage over the ends of the brake-beam or compression member, the socket being slightly smaller in size than the exterior of the beam, so that when the heads are forced thereon they compress the beam, (which is possible, owing to the slot between the flanges, as described,) and thus prevent any rattling or looseness. The heads are positively held in position by extending the strut, and thus drawing up on the truss-rod.

The strut consists of the head L of a suitable shape to be pressed over the beam and rest centrally thereon and of a size to obtain the spring effect of the slitted beam to hold it against rattling or displacement. This head is provided with an aperture having the enlarged portion $a$ and at its end a screw-threaded aperture. M is a stem fitting in the center bore $a$ and guided therein and having the screw $b$ engaging in the screw-threaded aperture and adjustable therein by turning. This stem has a head or nut N thereon and a stud O projecting centrally from the opposite side thereof. P is the body portion of the strut, having a suitable notch P' to engage with the truss, a bearing Q for the brake-lever, and at the inner end is provided with a recess for the stud O, around which are a series of ratchet-teeth S, and on the head N are corresponding teeth T, engaging therewith. These parts of the strut, assembled as shown in Fig. 1, operate as follows: The man turns the head N, which extends the strut against the truss until the desired length is obtained and the desired camber given to the beam. When this point is reached, it is evident that it cannot be turned in the reverse direction because of the engagement of the ratchet-teeth on the head and the body portion of the strut, which interlock. It is evident that the teeth may be placed on the head and simply the locking-lugs on the strut-body, if desired. It will be seen that with this device there is but a single cut which can by any possibility get loose in the entire beam, and that is securely locked.

What I claim as my invention is—

1. In a brake-beam a compression member comprising a metallic tube, triangular in configuration, the sides of the tube being equal and one of said sides being slotted centrally its entire length.

2. In a brake-beam, the combination with the brake-heads having sockets, truss-rods having heads engaging in said sockets, a compression member on which the brake-heads engage, comprising a sheet-metal triangular tube slitted along the middle of one face, a strut comprising a tubular head sleeved on the middle of the compression member and having a screw-threaded aperture, a screw-threaded stem engaging thereon, the head M thereon, the stud O projecting centrally from the head, the strut-body P having at one end a recess for the stud, at the other end a notch to engage the rod, an intermediate bearing for the brake-lever and ratchet-teeth on the meeting faces of the head and strut-body to lock the stem from reverse movement.

3. In a brake-beam a tubular member formed of sheet metal bent to form a substantially triangular tube, longitudinally slotted in the middle of its rear face, of a reinforcing-sleeve, slitted on the side opposite from the slit in the tube, said sleeve being forced on the tube to its middle and extending half the length of the tube more or less, and the strut, having a tubular head forced centrally upon the sleeve.

In testimony whereof I affix my signature in presence of two witnesses.

WILLIAM A. PUNGS.

Witnesses.
JAMES WHITTEMORE,
M. B. O'DOGHERTY.